(12) United States Patent
Amouris

(10) Patent No.: US 7,304,963 B2
(45) Date of Patent: Dec. 4, 2007

(54) METHOD AND SYSTEM FOR DYNAMICALLY ALLOCATING A SET OF BROADCAST TDMA CHANNELS TO A NETWORK OF TRANSCEIVER NODES

(76) Inventor: Konstantinos Amouris, 19 Country Club Rd., Apartment 52, Eatontown, NJ (US) 07724

( * ) Notice: Subject to any disclaimer, the term of this patent is extended or adjusted under 35 U.S.C. 154(b) by 795 days.

(21) Appl. No.: 10/655,504

(22) Filed: Sep. 4, 2003

(65) Prior Publication Data

US 2004/0156342 A1    Aug. 12, 2004

Related U.S. Application Data

(60) Provisional application No. 60/408,208, filed on Sep. 4, 2002.

(51) Int. Cl.
    *H04B 7/212* (2006.01)
(52) U.S. Cl. ............... 370/321; 370/337; 370/347; 370/442
(58) Field of Classification Search ........ 370/328–338, 370/263, 265, 310, 380, 314, 344–345, 347, 370/349–350, 369–376, 442, 458, 508, 915, 370/395.4, FOR. 106, FOR. 109, FOR. 114, 370/319–321, 341, 431; 455/422.1, 403, 455/434, 509–517, 450, 455, 560–561, 550.1, 455/464, 425, 446–451, 452.2, 453, 456.3, 455/556.2

See application file for complete search history.

(56) References Cited

U.S. PATENT DOCUMENTS 5,729,539 A * 3/1998 Heeschen et al. ........... 370/332
6,385,452 B1 * 5/2002 Zadeh et al. ................ 455/440

(Continued)

OTHER PUBLICATIONS

Tseng et al., "Dynamic Channel Allocation with Location Awareness for Multi-hop Mobile Ad Hoc Networks", Computer Comm., vol. 25, No. 7, pp. 676-688(13) (2002).

*Primary Examiner*—Meless Zewdu
(74) *Attorney, Agent, or Firm*—Carter, DeLuca, Farrell & Schmidt, LLP

(57) ABSTRACT

A method and system for assigning a set of TDMA channel-action pairs to a network of transceiver nodes spread over a predetermined geographic area. The method comprises the steps of: defining a periodic TDMA frame that consists of a specified number of timeslots, wherein each timeslot of the frame has a unique identification number; defining for each transceiver node a common function that assigns one channel-action pair to a given input combination, wherein said given input combination comprises a timeslot identification number and a set of space coordinates; and performing the following steps for each one of the transceiver nodes: periodically obtaining the identification number of the current timeslot; periodically identifying a set of space coordinates; and assigning to each one of the transceiver nodes the channel-action pair assigned by said common function to the input combination comprising the periodically obtained identification number of the current timeslot and the periodically identified set of space coordinates. The action in said channel-action pair takes values from a communication action set comprising the communication actions of transmitting a transmission unit, and receiving a transmission unit, wherein said transmission unit is identified by the channel identification number specifying the channel in which said transmission unit was originated. The periodically identified set of space coordinates corresponds to the current set of space coordinates for each one of the transceiver nodes.

6 Claims, 4 Drawing Sheets

FIG. 3

U.S. PATENT DOCUMENTS 6,414,955 B1 *  7/2002  Clare et al. .................. 370/390
7,082,111 B2 *  7/2006  Amouris ..................... 370/321
2003/0026286 A1 *  2/2003  Nakamura .................. 370/442
2003/0176198 A1 *  9/2003  Chisholm ................... 455/463

* cited by examiner

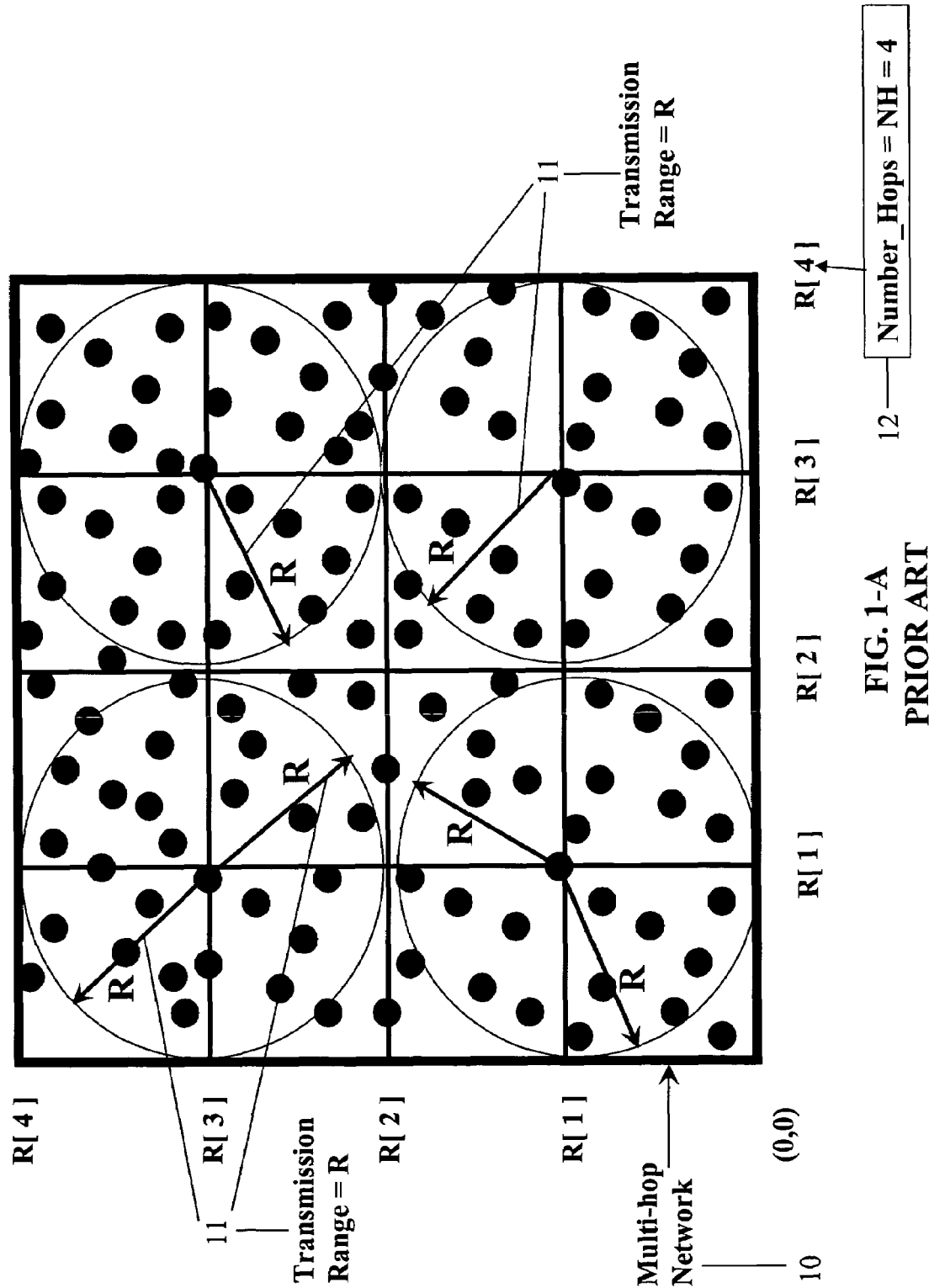
FIG. 1-A
PRIOR ART

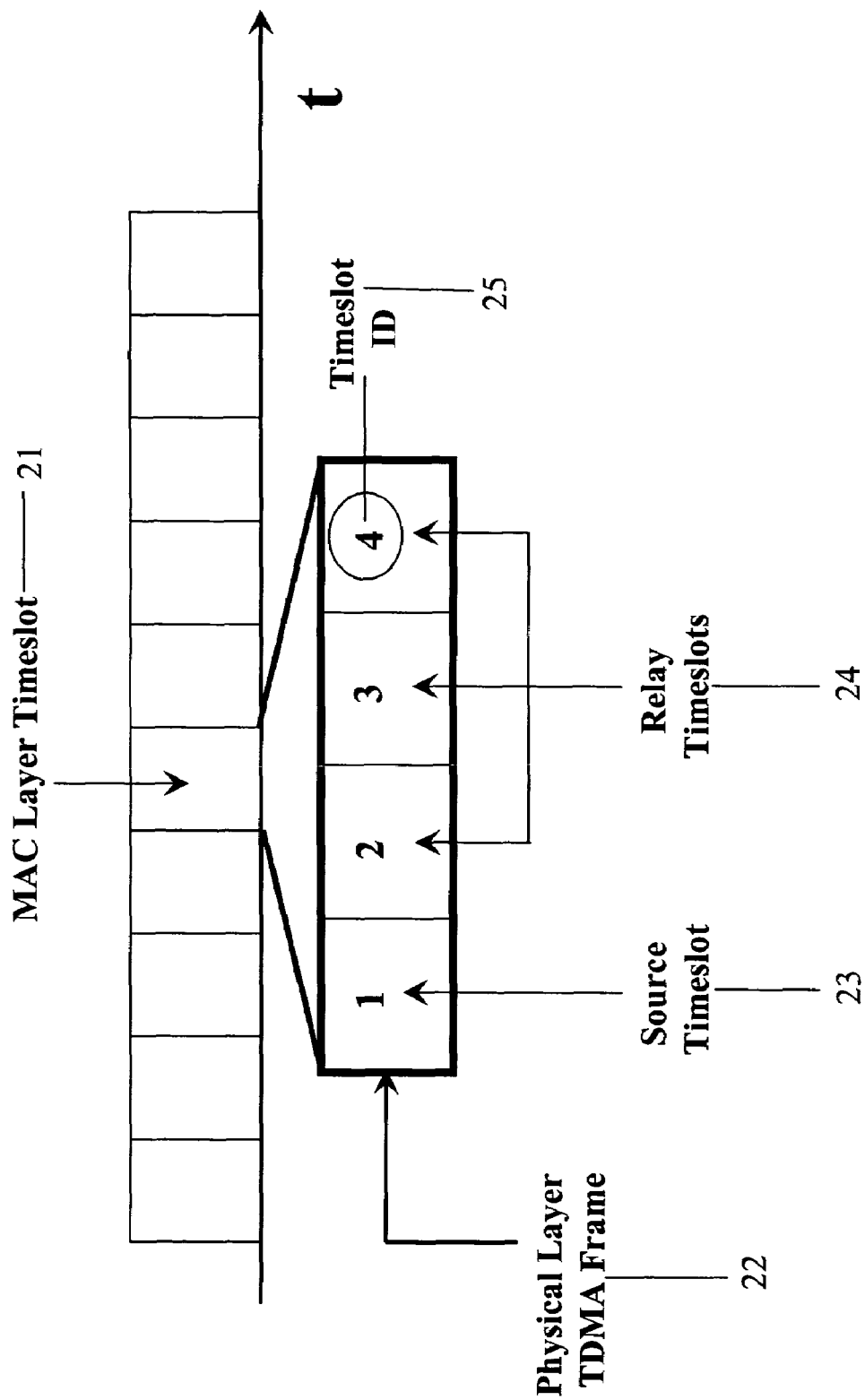
FIG. 1-B
PRIOR ART

METHOD AND SYSTEM FOR DYNAMICALLY ALLOCATING A SET OF BROADCAST TDMA CHANNELS TO A NETWORK OF TRANSCEIVER NODES

This application claims priority to a U.S. Provisional Patent Application filed on Sep. 4, 2002 and assigned U.S. Provisional Application Ser. No. 60/408,208, the entire contents of which are incorporated herein by reference.

BACKGROUND OF THE INVENTION

1. Field of the Invention

The invention relates to the field of wireless communications, and specifically the invention relates to a method and system for dynamically allocating a set of broadcast TDMA channels to a network of transceiver nodes.

2. Description of the Prior Art

EPLRS (Enhanced Position Location Reporting System) is a legacy tactical communications radio system, and is currently used as the backbone of the lower Tactical Internet. EPLRS is a multi-channel TDMA radio system that provides different networking modes/services such as point-to-point circuit establishment and maintenance for unicast traffic, as well as multicasting/broadcasting for multicast/broadcast traffic. The networking mode of EPLRS that supports multicasting/broadcasting is called 'EPLRS CSMA'. EPLRS CSMA can be described as a time slotted carrier sense multiple access (CSMA) system.

Referring to FIG. 1-A, the networks supported by EPLRS CSMA are dispersed over wide geographic areas resulting in a multi-hop network 10, since a given node can only reach other nodes located within its transmission range R 11. Therefore, in order to ensure reception of a transmission by all members of an EPLRS CSMA network, the transmission has to be relayed enough times so that even the radios furthest away from the source receive the transmission. With continued reference to FIG. 1-A, let NH 12 (Number_Hops) represent the worst case end-to-end hop distance between a source and a potential receiver.

Referring to FIG. 1-B, it then follows that every physical layer timeslot used to originate a transmission (referred to as a source timeslot 23) has to be followed by [NH−1] relay timeslots 24 that facilitate the end-to-end propagation of the transmission to the entire multi-hop network 10. The grouping of a source timeslot 23 and the [NH−1] relay timeslots 24 that follow the source timeslot is referred to as a physical layer TDMA frame 22. So, it can be seen that if all radios were within one hop of each other (i.e., fully-connected network) the physical layer TDMA frame length would be reduced to just one timeslot. With continued reference to FIG. 1-B, the 1st timeslot of a frame 23 is used by the winner(s) of the channel access contention to transmit a Transmission Unit (TU). Radios transmitting on the 1st timeslot 23 (i.e., the source timeslot) of a frame are referred to as source radios. The remaining [NH−1] relay timeslots 24 are used by the rest of the radios to flood-relay the received TU throughout the entire network. Flood-relaying works as follows: when a radio receives a particular TU for the first time, it will retransmit that TU in the following timeslot only. In other words, a given radio can relay a particular TU only once during a particular physical layer frame. When multiple radios are relaying simultaneously, potential receivers are able to capture one of the transmissions (usually the one closest to them), and treat the other transmissions as noise.

It is evident that the more geographically dispersed the network is, the larger the frame 22 length has to be in order to provide end-to-end (ETE) connectivity, resulting in a reduction of the effective TU throughput. For a frame length of NH timeslots, since only one TU is propagated throughout the network for every NH timeslots, the effective ETE TU Throughput (%) is equal to (1/NH)*100. For the rest of the invention presentation, we let NH be equal to 4. Then, it follows that the ETE TU throughput of an EPLRS CSMA 4-hop network is equal to 25%.

SUMMARY OF THE INVENTION

The present invention provides a method and system that rely on the parallel use of the multiple channels available to EPLRS, and increase the ETE TU throughput of EPLRS CSMA by 60% (i.e. from 25% to 40%). This is achieved by constructing a physical layer time frame that allows 4 TUs to be flood-relayed in 10 timeslots by using multiple channels in parallel, resulting in an ETE TU throughput of 40%, a 60% increase over 25%.

In particular the present invention provides a method and system for assigning a set of TDMA channel-action pairs to a network of transceiver nodes spread over a predetermined geographic area. The method comprises the steps of: defining a periodic TDMA frame that consists of a specified number of timeslots, wherein each timeslot of the frame has a unique identification number; defining for each transceiver node a common function that assigns one channel-action pair to a given input combination, wherein said given input combination comprises a timeslot identification number and a set of space coordinates; and performing the following steps for each one of the transceiver nodes: periodically obtaining the identification number of the current timeslot; periodically identifying a set of space coordinates; and assigning to each one of the transceiver nodes the channel-action pair assigned by said common function to the input combination comprising the periodically obtained identification number of the current timeslot and the periodically identified set of space coordinates. The action in said channel-action pair takes values from a communication action set comprising the communication actions of transmitting a transmission unit, and receiving a transmission unit, wherein said transmission unit is identified by the channel identification number specifying the channel in which said transmission unit was originated. The periodically identified set of space coordinates corresponds to the current set of space coordinates for each one of the transceiver nodes.

Accordingly, several objects and advantages of the present invention are realized, such as the following:

a) An increase in the End-To-End (ETE) Transmission Unit (TU) throughput of a 4-hop EPLRS CSMA network from 25% to 40%, a 60% throughput increase.

b) An increase in the End-To-End (ETE) Transmission Unit (TU) throughput of a 6-hop EPLRS CSMA network from 16.7% to 28.6%, a 71% throughput increase.

BRIEF DESCRIPTION OF THE DRAWINGS

FIG. 1-A is a diagram of a multi-hop network of nodes according to the prior art;

FIG. 1-B is an illustration of the EPLRS CSMA time frame structure according to the prior art;

DETAILED DESCRIPTION OF THE INVENTION

Figure 2:
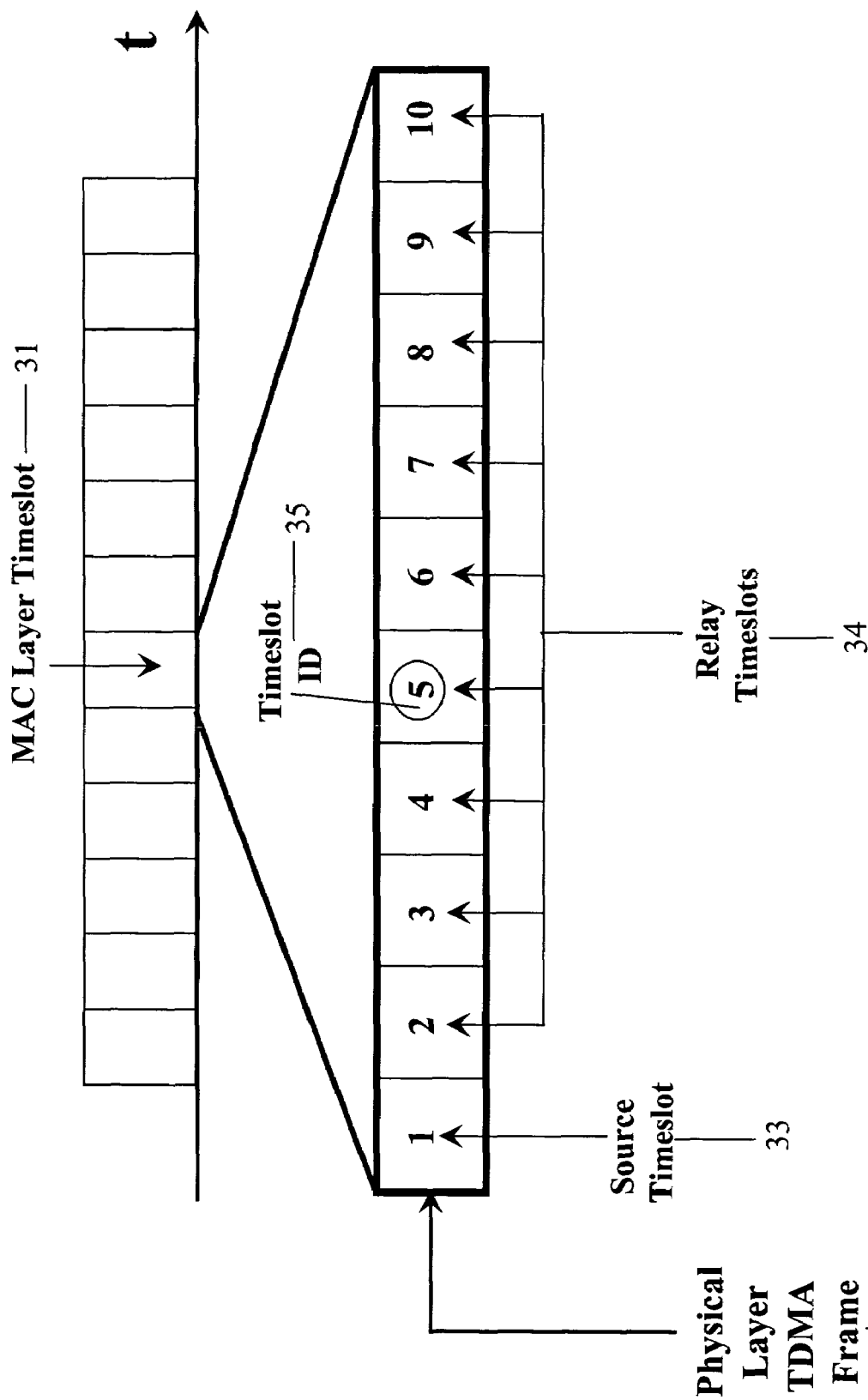
FIG. 2 is an illustration of the EPLRS CSMA time frame structure according to the principles of the present invention.

Referring to FIG. 2, according to the method of the present invention, we define a physical layer TDMA frame 32 with a frame length equal to 10 timeslots. Each timeslot is assigned a unique sequence/identification number 35. The frame is repeated in time indefinitely. The first timeslot of the frame 33 is used to originate-transmit a transmission unit (TU) by the winner(s) of the channel access contention. The remaining nine timeslots 34 of the frame are used for relaying 4 different TUs throughout the entire multi-hop network.

Figure 3:
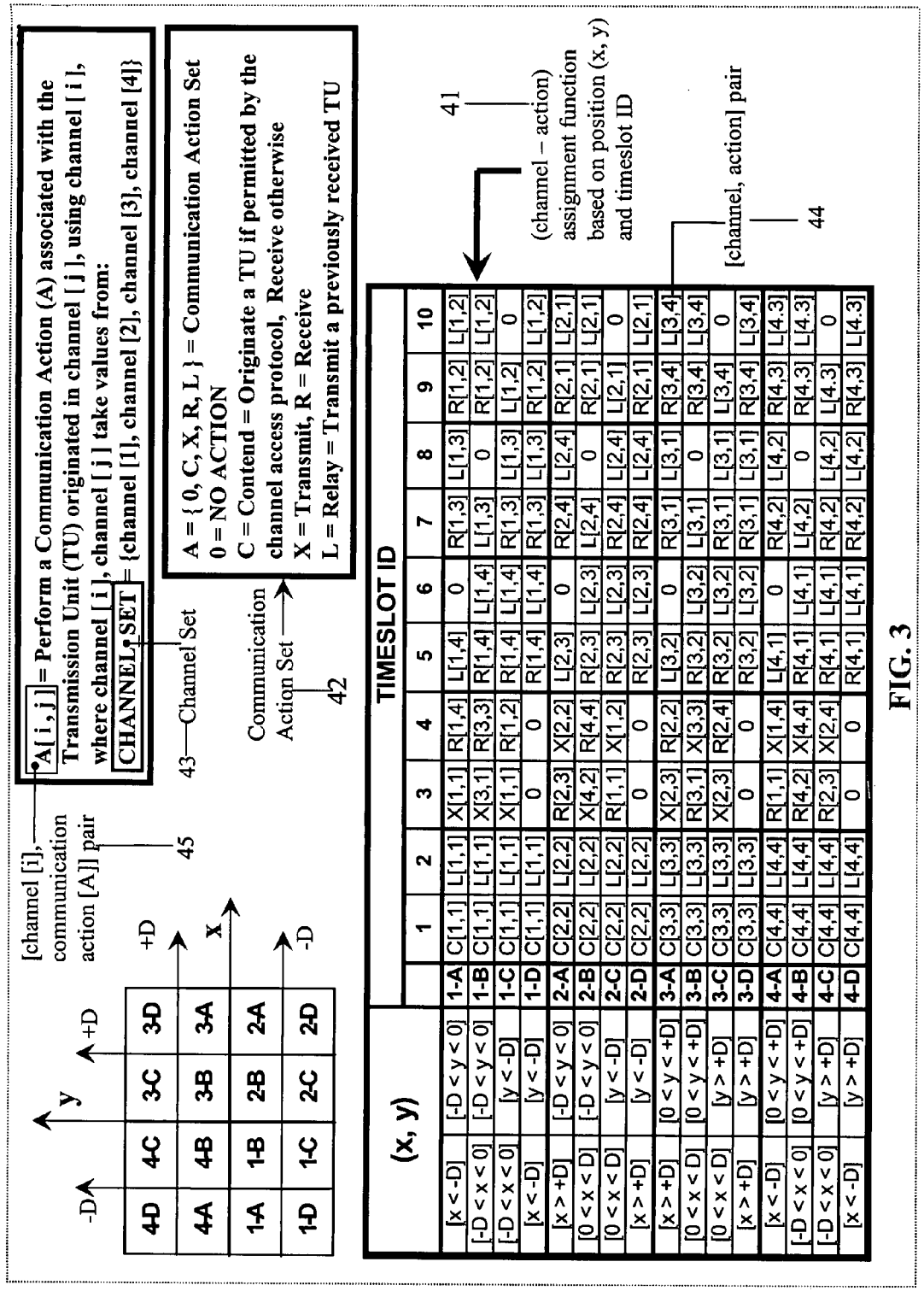
FIG. 3 graphically illustrates a two-dimensional function that assigns one channel-action pair to each [timeslot ID, position] combination according to the principles of the present invention.

Referring to FIG. 3, according to the method of the present invention, we define:
a) A set of channels 43 (frequency channels, or code channels) that will be used in parallel by each of the network's transceiver nodes,
b) A set of communication actions A (where A={0,C,X,R, L}) 42 that will be performed by each of the network's transceiver nodes, and
c) A two-dimensional function 41 that assigns a [channel—communication action] pair 44 to a given [position (x, y), timeslot ID] input combination.

With continued reference to FIG. 3, a [channel—communication action] pair 45 can be one of the following:
a) C[k, k]=Originate/transmit a TU in channel[k] using channel[k], if and only if permitted by channel[k ]'s access protocol, otherwise attempt to receive the TU that some other node will originate/transmit in channel[k] using channel[k];
b) X[i, k]=Transmit (Retransmit) the TU that was originated in channel[k], using channel[i];
c) R[i, k]=Receive the TU that was originated in channel[k], using channel[i];
d) L[i, k]=Relay the TU that was originated in channel[k], using channel[i]. Obviously, a given TU can be relayed/transmitted by a node only after that node has received it (the TU). Therefore, if the node has not received the specified TU, then the node will attempt to receive that TU; or
0=No action.

The method operates in the following manner:

At the beginning of every timeslot, each transceiver node obtains:
a) Its current geographic position (x, y), and
b) The timeslot ID of the current timeslot.

A node can obtain its geographic position via usage of the Global Positioning System (GPS), or in the case of EPLRS, it can use the EPLRS radio system's ground triangulation/navigation mechanism.

Then, the node uses the two obtained inputs, and the two-dimensional function 41 that maps position (x, y) and timeslot ID (1,2, . . . , 10) to a channel-action pair 44, to identify the channel-action pair that it (the node) is assigned for the current timeslot. The assigned channel-action pair tells the node a) which channel to use for communication, and b) what communication action to perform/execute on that channel.

Referring back to FIG. 2, at the end of the time frame 32, each node in the network has received 4 different TUs, originated using (referring back to FIG. 3) 4 different channels 43.

One skilled in the art can appreciate that the method operates by using a set of programmable instructions executed by one or more processors in the network of transceiver nodes to perform the functions of the method as described in the specification. The set of programmable instructions can be stored on a computer readable medium, such as a CD-ROM, hard drive, 3.5" diskette, etc.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A method for switching between multiple communication channels in a network of transceiver nodes spread over a predetermined geographic area, the method comprising the steps of:
   providing a plurality of communication channels;
   defining a recurring TDMA frame that consists of a specified number of timeslots, wherein each timeslot of said recurring TDMA frame has a unique identification number;
   defining for each transceiver node a common function that assigns one communication channel from said plurality of communication channels to a given input combination, wherein said given input combination comprises a timeslot identification number uniquely identifying a timeslot in said recurring TDMA frame, and a set of space coordinates uniquely identifying a location within said predetermined geographic area; and
   performing the following steps for each one of said transceiver nodes:
      periodically obtaining the identification number of a current timeslot within said recurring TDMA frame;
      periodically identifying the set of space coordinates uniquely identifying the current location of said each one of said transceiver nodes; and
      switching said each one of said transceiver nodes to the communication channel assigned by said common function to the input combination comprising the periodically obtained identification number of a current timeslot within said recurring TDMA frame and the periodically identified set of space coordinates uniquely identifying the current location of said each one of said transceiver nodes.

2. The method of claim 1, wherein each communication channel in said plurality of communication channels is a Frequency Division Multiple Access channel.

3. The method of claim 1, wherein each communication channel in said plurality of communication channels is a Code Division Multiple Access channel.

4. A system for switching between multiple communication channels in a network of transceiver nodes spread over a predetermined geographic area, the system comprising:
   means for providing a plurality of communication channels;
   means for defining a recurring TDMA frame that consists of a specified number of timeslots, wherein each timeslot of said recurring TDMA frame has a unique identification number;

means for defining for each transceiver node a common function that assigns one communication channel from said plurality of communication channels to a given input combination, wherein said given input combination comprises a timeslot identification number uniquely identifying a timeslot in said recurring TDMA frame, and a set of space coordinates uniquely identifying a location within said predetermined geographic area; and means for performing the following steps for each one of said transceiver nodes:
  periodically obtaining the identification number of a current timeslot within said recurring TDMA frame;
  periodically identifying the set of space coordinates uniquely identifying the current location of said each one of said transceiver nodes; and
  switching said each one of said transceiver nodes to the communication channel assigned by said common function to the input combination comprising the periodically obtained identification number of a current timeslot within said recurring TDMA frame and the periodically identified set of space coordinates uniquely identifying the current location of said each one of said transceiver nodes.

5. The system of claim 4, wherein each communication channel in said plurality of communication channels is a Frequency Division Multiple Access channel.

6. The system of claim 4, wherein each communication channel in said plurality of communication channels is a Code Division Multiple Access channel.

* * * * *